United States Patent [19]
Lauritzen et al.

[11] Patent Number: 5,407,227
[45] Date of Patent: Apr. 18, 1995

[54] INFLATABLE RESTRAINT SYSTEM REACTION CANISTER WITH INTEGRAL INFLATOR CHAMBER

[75] Inventors: Donald R. Lauritzen, Hyrum; Larry D. Rose, Layton, both of Utah

[73] Assignee: Morton International, Inc., Chicago, Ill.

[21] Appl. No.: 46,692

[22] Filed: Apr. 12, 1993

Related U.S. Application Data

[63] Continuation-in-part of Ser. No. 840,238, Feb. 24, 1992, Pat. No. 5,332,256.

[51] Int. Cl.6 .............................................. B60R 21/16
[52] U.S. Cl. ................................ 280/728 R; 280/732; 280/739
[58] Field of Search .......... 280/728 R, 728 A, 728 B, 280/732, 736, 738, 739, 740, 741

[56] References Cited

U.S. PATENT DOCUMENTS

| | | | |
|---|---|---|---|
| 3,778,083 | 12/1973 | Hamasaki | 280/739 |
| 3,938,826 | 2/1976 | Giorgini et al. | 280/738 |
| 4,111,457 | 9/1978 | Kob et al. | 280/728 |
| 4,877,264 | 10/1989 | Cuevas | 280/731 |
| 4,941,678 | 7/1990 | Lauritzen et al. | 280/728 B |
| 4,964,654 | 10/1990 | Bishop et al. | 280/728 A |
| 4,986,569 | 1/1991 | Bruton | 280/743 |
| 5,058,919 | 10/1991 | Paquette et al. | 280/732 |
| 5,069,480 | 12/1991 | Good | 280/743 |
| 5,209,519 | 5/1993 | Shiga et al. | 280/728 A |
| 5,259,643 | 11/1993 | Kraft et al. | 280/740 |
| 5,261,693 | 11/1993 | Krickl et al. | 280/732 |
| 5,263,739 | 11/1993 | Webber et al. | 280/732 |
| 5,280,948 | 1/1994 | Henseler et al. | 280/728 A |
| 5,284,358 | 2/1994 | Rhein | 280/728 A |

FOREIGN PATENT DOCUMENTS

| | | |
|---|---|---|
| 0496267 | 7/1992 | European Pat. Off. |
| 0529304 | 3/1993 | European Pat. Off. |
| 2151938 | 4/1973 | France |

*Primary Examiner*—Margaret A. Focarino
*Assistant Examiner*—Paul N. Dickson
*Attorney, Agent, or Firm*—Nick C. Kottis; Gerald K. White

[57] ABSTRACT

A reaction canister body part having an integral inflator chamber and an inflatable restraint system using reaction canister assemblies with such a body part are provided.

20 Claims, 5 Drawing Sheets

INFLATABLE RESTRAINT SYSTEM REACTION CANISTER WITH INTEGRAL INFLATOR CHAMBER

CROSS REFERENCE TO RELATED APPLICATION

This application is a continuation-in-part application of application, U.S. Ser. No. 07/840,238 now U.S. Pat. No. 5,332,256, filed on Feb. 24, 1992. The co-pending parent application is hereby incorporated by reference herein and is made a part hereof, including but not limited to those portions which specifically appear hereinafter.

BACKGROUND OF THE INVENTION

This invention relates generally to inflatable passive restraint systems such as used in motor vehicles to restrain the movement of a seated occupant during a collision. One aspect of the invention is more particularly directed to an improvement in the design of an air bag module used in such restraint systems to minimize deformation of the module and possible damage to the dashboard and/or instrument panel of a vehicle with the deployment of the air bag. Such improvement is in the structure internal to the module for a) housing and positioning the inflator and the air bag and b) directing the inflating gas flow or jet for best deployment of the air bag.

In another aspect, the invention more particularly relates to an improvement in the structure used in such systems for housing a gas generation material and an inflatable bag to further reduce the weight of the assembly and to permit the more effective and economical incorporation therein of various design features.

Some terminology herein is used for convenience in reference only and is not intended to be limiting. The words "forwardly" and "rearwardly" refer to the normal forward and reverse directions of travel of the vehicle to which a passenger passive restraint module is attached. The phrase "thrust neutral" refers to the production by an inflator of zero thrust when initiated as, for example, during a deployment event or accidentally such as during shipping, storage, or handling thereof. That is to say, the gas discharge openings in the inflator are so positioned that the gas is discharged in opposing directions whereby there are no resulting forces tending to cause physical movement of the inflator. Hence, the inflator will expend the energy generated thereby, generally in place.

The state of the prior art is indicated by the following U.S. patents:

| U.S. Pat. No. | Issue Date | Patentee |
| --- | --- | --- |
| 3,414,292 | December 3, 1968 | S. Oldberg et al. |
| 3,715,131 | February 6, 1973 | E. K. Hurley et al. |
| 3,880,447 | April 29, 1975 | W. F. Thorn et al. |
| 4,332,398 | June 1, 1982 | G. R. Smith |
| 4,817,828 | April 4, 1989 | G. W. Goetz |
| 4,832,300 | June 27, 1989 | J. F. Ziomek et al. |
| 4,941,678 | July 17, 1990 | D. R. Lauritzen et al. |

The Oldberg et al. patent discloses a safety device for providing protection for vehicle passengers comprising a folded inflatable crash bag closely surrounding an elongated cylindrical diffuser member, being secured thereto by clamps. The diffuser member defines a chamber in which an inflator comprising a fluid reservoir in an inner container is concentrically located. For providing a tight seal the inner container is seam welded at the opposite ends thereof to the diffuser member. When activated by explosive means, fluid from the reservoir flows rearwardly from one side only of the inflator against an adjacent inner wall of the diffuser member. The flow divides and is discharged forwardly through a single row of longitudinally spaced apart openings, that are provided on one side only of the diffuser member, against a fixed baffle member. The baffle member divides and redirects the fluid rearwardly into the inflatable bag.

In the fabrication and assembly of inflatable devices for protecting vehicle passengers, the inflator poses a large potential hazard. Accidental initiation thereof during shipping, storing and installation in the safety device could result in injury to personnel and also cause property damage, particularly when the inflator is not of the thrust neutral type. Thus, in order to minimize the possibility of such injury and damage, it is desirable to reduce the amount of handling to which the inflator is subjected during the fabrication and assembly of the safety device. Installation of the inflator as a last operation in the assembly of the device would provide a substantial reduction in the risk of injury and damage. With the use of an inflator of the thrust neutral type, the risk of such injury and damage would be further reduced.

The construction of the Oldberg et al. safety device is such as to preclude installation of the inflator as a last operation of the assembly of the device. Specifically, the inflatable bag is provided in closely surrounding relation to the diffuser member, with the inflator, that is, the inner container, welded at the ends thereof to the diffuser member. Moreover, with fluid flowing from the reservoir of fluid from one side only of the inflator and from one side only of the diffuser member, neither the inflator alone, nor the inflator and diffuser member, as a unit, are thrust neutral.

The Hurley et al. patent discloses a folded inflatable bag surrounding a gas generator having a head assembly of cylindrical shape provided with a closed end and an open aft end that is closed by a closure plate. A centrally positioned orifice that is normally closed by a rupture disc is provided in the closure plate. Enclosing the cylindrical portion of the head assembly is a concentrically positioned diffuser having a closed end in the shape of a dished head, thereby providing an annular cavity about the gas releases, in response to pressure in the head assembly exceeding the burst pressure of the disc, thereby allowing the generated gas to flow out of the orifice in the closure plate of the aft end of the gas generator and to impinge on the inner wall at the end of the diffuser. This causes the gas to be dispersed into the annular cavity and out of a plurality of openings spaced around the wall of the diffuser. With the generated gas flowing out of the aft end of the gas generator, the operation thereof is not thrust neutral. Nor does the Hurley construction allow fabrication of the device with the installation of the gas generator as a last operation of the assembly.

The Thorn et al. patent discloses a folded inflatable bag positioned in close contact with an elongated cylindrical gas generator. The gas generator is provided with rows of gas outlet ports that extend 360° around the cylinder. The gas is discharged in opposing directions and produces counteracting thrusts, and thus, is thrust neutral. A gas redirecting plate in the shape of a half cylindrical container is positioned in spaced relation around the forwardly facing portion of the gas generator. The plate redirects forwardly discharged inflating gas in a rearward direction into the inflatable bag. Redirected gas together with gas that directly is discharged into the inflatable bag deploy the bag, which normally is folded, to an inflated condition. In the stored position thereof, the bag is positioned closely adjacent to and in contact with the rearward half side of the gas generator. This precludes installation of the gas generator as a last operation in the assembly of the apparatus.

The Smith patent discloses an inflatable restraint system including a folded inflatable cushion, a concentric elongated cylinder inflator-diffuser combination, and an elongated horizontally orientated nozzle. The inflator and diffuser are located within the confines of the folded cushion and are connected as a unit to the side walls of a housing therefor by means of bolts which extend into tapped bosses, which bosses are rigid with the combined unit. Consequently, neither the combined unit, nor the inflator can be installed as a last operation in the assembly of the system.

In the Goetz patent an elongated cylindrical inflator and a folded air bag are mounted in a rigid reaction canister which is fixed to the dashboard of a vehicle, with the orientation and arrangement of gas discharge openings or exhaust ports in the inflator being such that, when activated, an initial flow generated gas is directed rearwardly by the inflator to inflate the bag. Excess gas flows from the inflator in a forward direction into the surrounding environment. This result is achieved by using rupturable foil layers to close both forwardly and rearwardly directed inflator exhaust ports, with rupturing of the rearwardly directed ports occurring at a pre-selected pressure that is lower than the pressure at which the forwardly directed ports rupture. Thus, the inflator is not thrust neutral, nor is it capable of installation as a last operation of the assembly of the apparatus because of the positioning in the reaction canister of the folded air bag in close proximity to the inflator.

As disclosed in the Goetz patent and the other aforementioned prior art patents, it is known in prior art installations to provide a container to house the air bag and the inflator. The container is generally referred to as a reaction canister and provides a medium for installing and retaining a module in the instrument panel by the utilization of suitable brackets.

The reaction canister provides protection for the inflator, the diffuser, if provided, and the air bag until the time of deployment of the bag. Additionally, the reaction canister absorbs the loads that are produced upon deployment of the bag, which loads, typically, are large. Unless sufficiently absorbed, such loads can cause serious damage to the interior of the vehicle, and in particular, to the instrument panel.

A drawback to the use of a reaction canister in an air bag module for passenger protection is the envelope in the dashboard or instrument panel that is allotted for the installation of the module. Resulting restrictions, usually in height, causes lengthened, that is, deeper, top and bottom panels in order to accommodate the folded volume of the air bag. The bag is then restricted for unfolding and must travel rearwardly a distance greater than desirable before unfolding. Because of the large amount of gas that is produced and the distance the bag needs to travel before unfolding, pressure builds up in the reaction canister to a level that tends to expand the canister and cause it to bulge. This condition, known as bell mouthing, is very destructive of the instrument panel, and is particularly objectionable in low speed crashes where other damage to the vehicle is small.

The Ziomek et al. patent and the Lauritzen et al. patent disclose the use of a tether strap to resist the spreading forces on the reaction canister and thereby preclude bell mouthing upon deployment of the air bag. This technique allows the use of lighter weight and less expensive reaction canisters. The structural arrangement, however, leaves something to be desired in respect of the introduction of undesirable complication into the manufacturing and assembling operations, and moreover, does not allow installation of the inflator as a last operation in the assembly of the module.

Thus, in general, air bag module assemblies of the prior art generally include three basic components: 1) a cushion or air bag that is inflated with gas such as when the vehicle encounters a sudden deceleration, 2) an inflator which upon actuation serves to provide the gas used to inflate the air bag, and 3) a reaction canister which typically functions as a structural housing supporting both the inflator and the air bag while providing a mounting base for installation of the assembly in a vehicle and direction to the resulting from the inflator.

In general, because of the relatively high pressures generated in conventional inflators, e.g., pyrotechnic inflators commonly produce pressures in the range of about 1500–3000 psi, the walls of such inflators are typically fabricated of relatively thick material to provide additional strength thereto. However, as described above, in conventional air bag module assemblies, the inflator is typically housed within a walled reaction canister. The use of such thick walled inflators housed within a walled reaction housing typically results in an assembly of greater weight than is optimally desired.

Further, as reaction canisters are commonly fabricated using formed and/or welded steel, such fabrication techniques are not conducive to the economical and effective incorporation therein of various desired features, such as various mounting or attachment preparations, for example, in particular vehicular inflatable restraint system design applications.

Still further, an increasing emphasis on weight reduction in automobiles has created a need and a demand for a lighter weight inflatable restraint system.

Thus, there is a need and a demand for an improved reaction canister for use in an air bag module for the passenger side of a vehicle.

SUMMARY OF THE INVENTION

An object of the invention is to provide a reaction canister including a diffuser integral therewith for housing and positioning an inflator and an inflatable bag and for directing a gas jet produced by the inflator for inflating the bag.

Another object of the invention is to provide a reaction canister wherein the diffuser is a continuous circumference one piece diffuser.

Another object of the invention is to provide such a reaction canister which is so arranged as to permit installation of the inflator from the outside of the reaction canister thereby allowing installation of the inflator as a last operation of assembly.

Still another object of the invention is to provide such a reaction canister in which a thrust neutral inflator for safety may be used while retaining the advantage of being able to direct a gas jet that can be biased for best bag deployment.

In accomplishing these and other objectives of the invention, one aspect of the invention provides a reaction canister that features the assembly integrally therewith of a diffuser tube of continuous circumference. This type of diffuser tube provides a strong attachment means for the diffuser, indexing of the diffuser, containment of the generated gases of combustion at a lower gas pressure and provides a method of directing the gas for better bag deployment.

Other benefits derived from the use of a diffuser tube integral with the reaction canister are an easy method of sealing the gas generator or inflator against leakage into the passenger compartment, and a simpler inflator installation from the outside of the reaction canister thereby making the inflator installation a last operation of assembly. A thrust neutral inflator for safety may also be used while still retaining the advantage of being able to direct a gas jet that can be biased for best bag deployment. Still another benefit of the diffuser tube is a reduced, unsupported top and bottom panels depth that can help reduce the tendency of the reaction canister to undergo bell mouthing.

The diffuser tube is a circumferential stress member wherein the majority of the stress from gas pressure can be taken out as tensile stress.

The reaction canister provides a vehicle for the incorporation or attachment of brackets for installation into the instrument panel of an automotive vehicle. The reaction canister also provides a secure reliable attachment for the inflatable bag.

The inflator is securely installed in the reaction canister. This installation is a unique feature of the present invention. The inflator utilized has an elongated cylindrical shape and incorporates a gas flow outlet or exhaust port arrangement that renders the inflator thrust neutral.

In accordance with one aspect of the present invention, the exhaust port arrangement of the inflator that is employed differs in an important and significant respect from that disclosed in the Thorn et al. patent in that the rows of gas outlet openings or exhaust ports do not extend 360° around the cylindrical inflator. Instead, several rows of exhaust ports parallel to the longitudinal axis of the inflator are provided on each side of the latter, with each row on one side being spaced 180° from a row on the other side.

In order to enable the use of the generated gas jet to direct the deployment of the inflatable bag while retaining the safety feature of thrust neutrality for the gas generator, a diffuser tube has been incorporated as an integral part of the reaction canister. This diffuser tube, in effect, becomes a low pressure vessel with holes or slots for directing the gas jet.

In a first embodiment of the invention, a continuous circumference one piece diffuser tube is provided for containing the initial reaction canister pressure and for directing gas flow through breakout of the inflatable bag. Problems solved by the continuous circumference diffuser tube used according to the invention and benefits derived therefore include the following:

1. The provision of structure to the body of the reaction canister, reducing the reacted surface area of the canister and thereby reducing the tendency to bell mouthing.
2. Containment of the gas flow impingement to these same surfaces, reducing the bell mouthing.
3. Providing a barrier between the inflator and the inflatable bag, thereby reducing the tendency to bag damage due to heat and eliminating bag and inflator interference at inflator installation.
4. Allowing the safety of using a thrust neutral inflator while still retaining the benefit of a directed flow for bag deployment without impingement of hot gases directly into the bag from the inflator.

Continuous circumference diffusers may be made of aluminum and steel and in combination. Similar configurations can be produced in extruded aluminum. There are limitations in the use of extruded aluminum in that the shape must be continuous over the entire length of the section. The chute top and bottom panels must be continuous with either the diffuser half or the cap half to be practical. Also, any features normal to the section surfaces must be second operation fabrication such as drilling, milling or punching.

All of the above arrangements may be duplicated in extruded aluminum or magnesium and in some instances cast in these same metals. Extruding presents some constraints in that one of the diffuser tube halves is required to be included in the top and bottom panels of the chute. The cap half is the logical half for this inclusion, leaving the diffuser half, being the smaller, left for second fabrication operations and/or different material applications.

A general object of another aspect of the invention is to provide an improved structure for use in housing a gas generant material and in housing and positioning an inflatable bag in an inflatable passive restraint system.

Another object of the invention is to provide a reaction canister structure having an integral chamber for housing a gas generant material.

A more specific objective of this aspect of the invention is to overcome one or more of the problems described above.

The general object of this aspect of the invention can be attained, at least in part, through a specifically shaped and/or formed body part for an inflatable passive restraint system reaction canister. The body part is formed by extrusion and is trough-shaped. The body part includes first and second opposite side walls and an integrally shaped inflator chamber having gas exit vents along at least one side thereof. The body part has first and second opposite ends with a plurality of end closure attachment preparations at each of the opposite ends.

The air bag module assemblies of the prior art generally include a thick walled inflator housed within a walled reaction canister and thereby undesirably increase the weight of the assembly. Further, the fabrication of reaction canisters using conventional machine tooling operations is not conducive to the economical and effective incorporation of various desired features, such as various mounting or attachment preparations, for example, in particular vehicular inflatable restraint system design applications.

The invention further comprehends a reaction canister for an inflatable passive restraint system. The reaction canister includes a specifically shaped and/or formed body part having first and second opposite side walls and an integrally shaped inflator chamber having gas exit vents along at least one side of the chamber. The body part further includes first and second opposite ends with a plurality of end closure attachment preparations at each of the said opposite ends. The reaction canister further includes first and second end closures attached to a respectively associated opposite end of the body part by means positioned in cooperative relation with the respective end closure attachment preparations. Each end closure further include an inflator chamber base portion positioned to receive an associated one of the ends of the integrally shaped inflator chamber of the body part.

The invention still further comprehends a reaction canister for an inflatable passive restraint system comprising an extruded aluminum trough-shaped body part, an air bag retainer/diffuser attached to the reaction canister body part, and first and second end closures. The body part includes first and second opposite side walls and an integrally shaped inflator chamber having gas exit vents along at least one side thereof. The body part further includes at least one integrally formed mounting portion of an external type for mounting of the reaction canister body part into a vehicle. The body part has first and second opposite ends with a plurality of end closure attachment preparations at each opposite end. Further, at least one of the side walls is formed continuously with the integrally shaped inflator chamber via a side wall connecting portion forming at least one gas cooling cavity therein. The side wall connecting portion includes at least one vent hole to permit venting of gas from the reaction canister and the gas cooling cavity contains a thermal conductive material of aluminum wool to facilitate cooling of vented gas. The reaction canister body part additionally includes at least one attachment sleeve preparation adapted for the attachment of the air bag retainer/diffuser to the reaction canister body part. The air bag retainer/diffuser is attached to the reaction canister body part by insert means positioned in cooperative relation with the attachment sleeve preparation. The first and second end closures are attached to a respectively associated opposite end of the body part by screw means positioned in cooperative relation with the respective end closure attachment preparations. Each of the first and second end closures further having an inflator chamber base portion positioned to receive an associated one of the ends of the integrally shaped inflator chamber of the body part, wherein at least one of the end closures includes an end plate and an end base.

As used herein, references to side wall or panel portions of the body part of the reaction canister being "top" or "bottom" are to be generally understood to be relative terms and in reference to the reaction canister as it is commonly installed in a vehicle.

Other objects and advantages will be apparent to those skilled in the art from the following detailed description taken in conjunction with the appended claims and drawings.

BRIEF DESCRIPTION OF THE DRAWINGS

A detailed description of the invention follows with reference to the accompanying drawings which form part of the specification, of which.

DETAILED DESCRIPTION OF THE INVENTION

Figure 1:
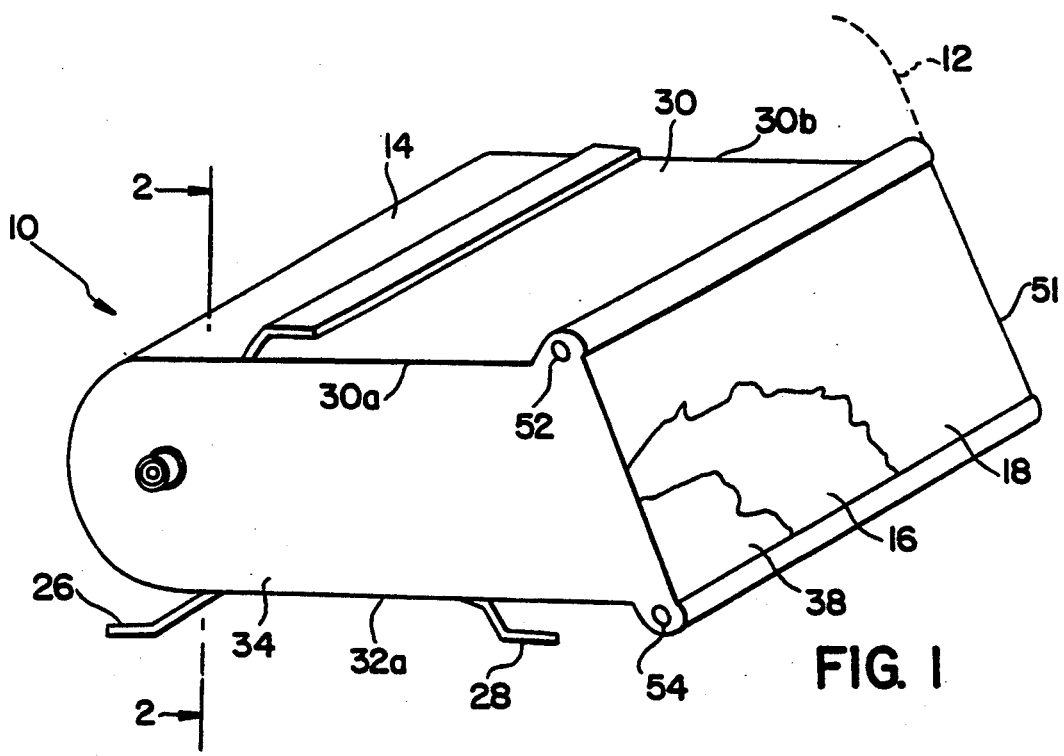
FIG. 1 is a perspective schematic illustration of the external profile of an integral reaction canister and diffuser tube for an air bag module according to one embodiment of the invention.

In FIG. 1 an air bag module 10 constructed according to one embodiment of the present invention is shown mounted in the instrument panel 12 of an automotive vehicle. For convenience of illustration the vehicle is not shown, the instrument panel 12 being indicated in phantom. The module 10 includes a reaction canister 14 which houses a folded air bag 16. A cover 18 for the air bag 16 is provided to prevent extraneous material from falling thereon and also into the reaction canister 14. The manner of attaching the cover forms no part of the present invention and, therefore, will not further be described herein.

Integrally formed with the reaction canister 14 is an elongated continuous circumference one piece diffuser tube 20. Axially spaced inflating gas exit ports or slots 22 are provided in the portion of the wall of the diffuser tube 20 that faces the air bag 16. Positioned within the diffuser tube 20 and rigidly held in a selected angular relation thereto, as further described hereinafter, is an inflator 24. Brackets 26 and 28 which are attached to the exterior of the reaction canister 14 are provided for facilitating the installation of the module 10 in the instrument panel 12. A decorative cover (not shown) which matches the profile of the surface of the instrument panel may be provided. When the module 10 is installed, such decorative cover forms part of the surface of the instrument panel.

The reaction canister 14 includes a top panel 30 and a bottom panel 32, each of which have a respective first edge 30a, 32a and a respective second edge 30b, 32b. The top panel 30 and bottom panel 32 in conjunction with the diffuser tube 20, a first end plate 34, and a second end plate 36 define a cavity 38. The air bag 16, folded in a conventional manner, is housed in cavity 38. In FIG. 1, the cover 18 has been partially broken away to reveal the folded air bag therein.

Figure 2:
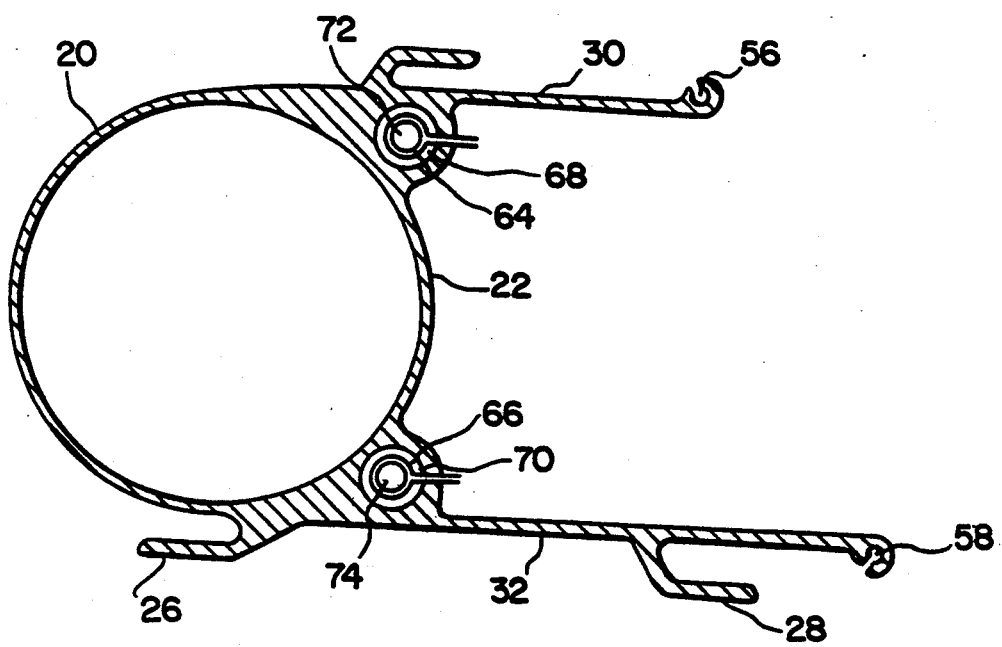
FIG. 2 is a sectional view taken along the lines 2—2 of FIG. 1 showing the continuous circumference one piece diffuser tube with integrally formed top and bottom panels of the reaction canister.
Figure 3:
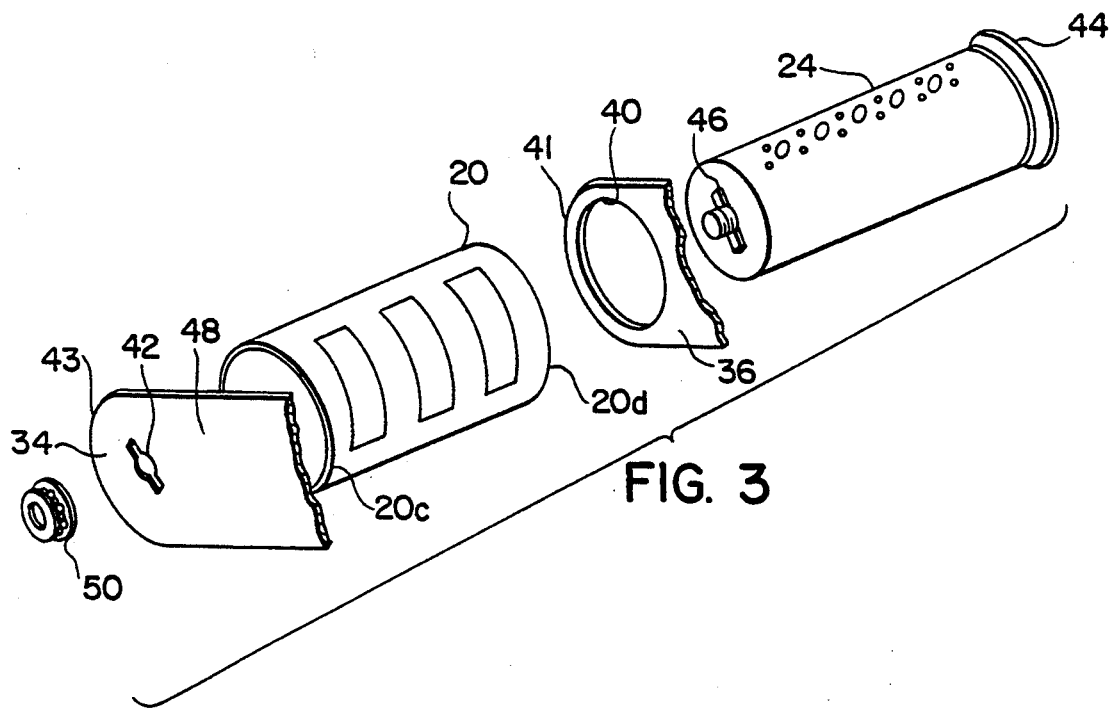
FIG. 3 is an exploded fragmentary view of the reaction canister of FIG. 1 illustrating the installation from the outside thereof of the inflator in the diffuser tube.

FIG. 2 shows a sectional view of the continuous circumference one piece diffuser tube 20 with the integrally formed top panel 30 and bottom panel 32 of the reaction canister 14. In other words, as shown, the diffuser 20 and the top panel 30 and the bottom panel 32 are formed as a continuous or unitary structure. By way of example and not limitation, it is noted that, in a preferred embodiment, this configuration can be produced in extruded aluminum. The slots 22 in the diffuser half of the diffuser tube 20, that half which faces the air bag 16 and the top panel 30 and the bottom panel 32, are located and sized so as to provide a desired distribution of gas generated by the inflator 24 into the air bag 16. The inflator 24 has an elongated cylindrical configuration, as shown in FIG. 3, and is retained in the diffuser tube 20, in concentric relation therewith, between the end plates 34 and 36.

In order to allow the inflator 24 to be inserted in the diffuser tube 20 as a last operation in the assembly of the module 10, a circular opening 40 is provided in a first end 41 of the second end plate 36 and a smaller opening 42 with a key slot therein is provided in a first end 43 of the first end plate 34. Also, as shown, a flange 44 is provided on a first end of the inflator 24 and a threaded keyed stud 46 is provided on the second end thereof. The size of the opening 40 in the second end plate 36 is such as to allow the inflator 24 to be inserted in a snug fit with the second of the inflator 24, that having the stud 46 thereon, being passed therethrough. Similarly, the size of the keyed opening 42 in the first end plate 34 is such as to snugly receive the stud 46. The arrangement is such that the relative angular positions of the inflator 24 and the diffuser tube 20 about the common longitudinal axis 48 thereof is determined by the keyed opening 42 in the first end plate 34 and the keyed inflator stud 46. A nut 50 on the stud 46 serves to hold the end plates 34 and 36 against first and second ends 20c and 20d, respectively, of the diffuser tube 20 with the inflator 24 captured therein.

The second end 51 of the end plate 36 and the second end 53 of the end plate 34, that is, the ends thereof adjacent the air bag cover 18, as seen in FIG. 1, are fixedly attached to the first and second edges, respectively, of the top panel 30 and the bottom panel 32 by drive screws 52 and 54. Screws 52 and 54 are screwed into grooves 56 and 58 that are provided at the respectively associated forwardly located edges of the top panel 30 and bottom panel 32.

The internal components of the inflator 24 forms no part of this aspect of the present invention and may be any of the number of known constructions that are available commercially. By way of example and not limitation, such internal components may comprise that disclosed in U.S. Pat. No. 4,890,860 granted to F. E. Schneiter on Jan. 2, 1990 and assigned to the assignee of the present invention.

Figure 4:
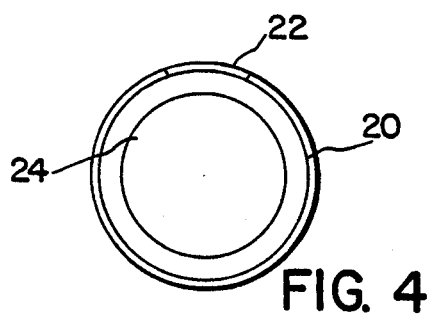
FIG. 4 is a schematic section view of the diffuser tube and inflator illustrating biasing of the jet flow of generated gases issuing from the diffuser slots.

As shown in FIG. 3, several longitudinal rows of axially spaced openings or exhaust ports 60 are provided on one side of inflator 24 parallel to the longitudinal axis 48 thereof and several substantially identical longitudinal rows of axially spaced exhaust ports 62 are provided on the other side thereof. The keying of the opening 42 in the first end plate 30 and of the inflator stud 46 is such as to cause the inflator rows of exhaust ports 60 and 62 to be selectively displaced angularly with respect to the diffuser slots 22 in the diffuser tube 20. This, as illustrated in FIG. 4, enables biasing of the jet flow of gases issuing from the slots 22. Selection of the degree of bias may readily be accomplished by appropriately angularly positioning, as by stamping, for example, of the keyed slot 42 in the first end plate 34 relatively to the keyed stud 46 on the end of the inflator 24.

Figure 5:
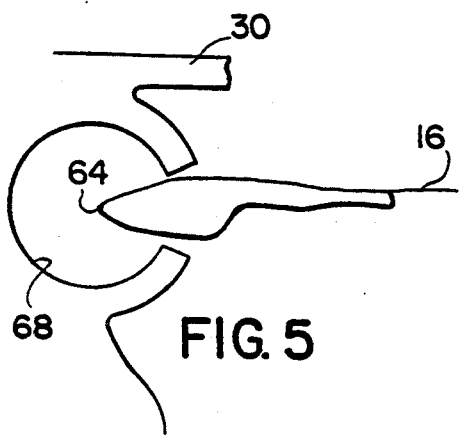
FIG. 5 is a fragmented detailed section view illustrating the manner of attachment of the air bag to the reaction canister.

For retaining the air bag 16 within the reaction canister 14, there is provided, as best seen in FIGS. 2 and 5, a pair of elongated key hole shaped slots or grooves 68 and 70 which are provided at the forward end of the cavity 38 in association, respectively, with the top panel 30 and the bottom panel 32. At each of the upper and lower sides of the generated gas inlet opening (not shown) of the air bag 16, the fabric is formed and sewn into a loop, specifically a loop 64 at the upper side and a loop 66 at the lower side, as shown in FIG. 2. Each of the loops 64 and 66 is inserted in a respectively associated elongated groove 68 and 70 that are formed at the forward ends of the upper and lower panels 30 and 32, respectively. Squeezing of the loops 64 and 66, as indicated in FIG. 5, is required to facilitate such insertion through a narrow entry way provided into each of the grooves 68 and 70. Retention of the loops 64 and 66 in the grooves 68 and 70, and thereby attachment of the air bag 16 to the reaction canister 14 and diffuser tube 20, is effected by the insertion of rods 72 and 74 through the loops 64 and 66, respectively, and thereby through the respectively associated grooves 68 and 70. The rods 72 and 74 may be fastened securely in fully inserted position in any suitable manner.

Thus, in accordance with the invention, there has been provided an improved reaction canister assembly enabling:

(a) a simpler installation of the inflator from outside the reaction canister thereby making possible the installation of the inflator as a last operation of assembly;

(b) the inflating gases generated by the inflator to be contained at a lower pressure;

(c) an efficacious method of sealing the inflator against leakage into the passenger compartment; and (d) the use of a thrust neutral inflator for safety while still retaining the advantage of being able to direct a gas flow that can be biased for best bag deployment.

Briefly summarizing, these and other advantages, as described herein, have been achieved by the use of a reaction canister including a diffuser tube integral therewith for housing and positioning an inflator and an inflatable bag and for directing an inflating gas jet produced by the inflator for inflating the bag. In one embodiment, the diffuser is a continuous circumference one piece diffuser.

Figure 6:
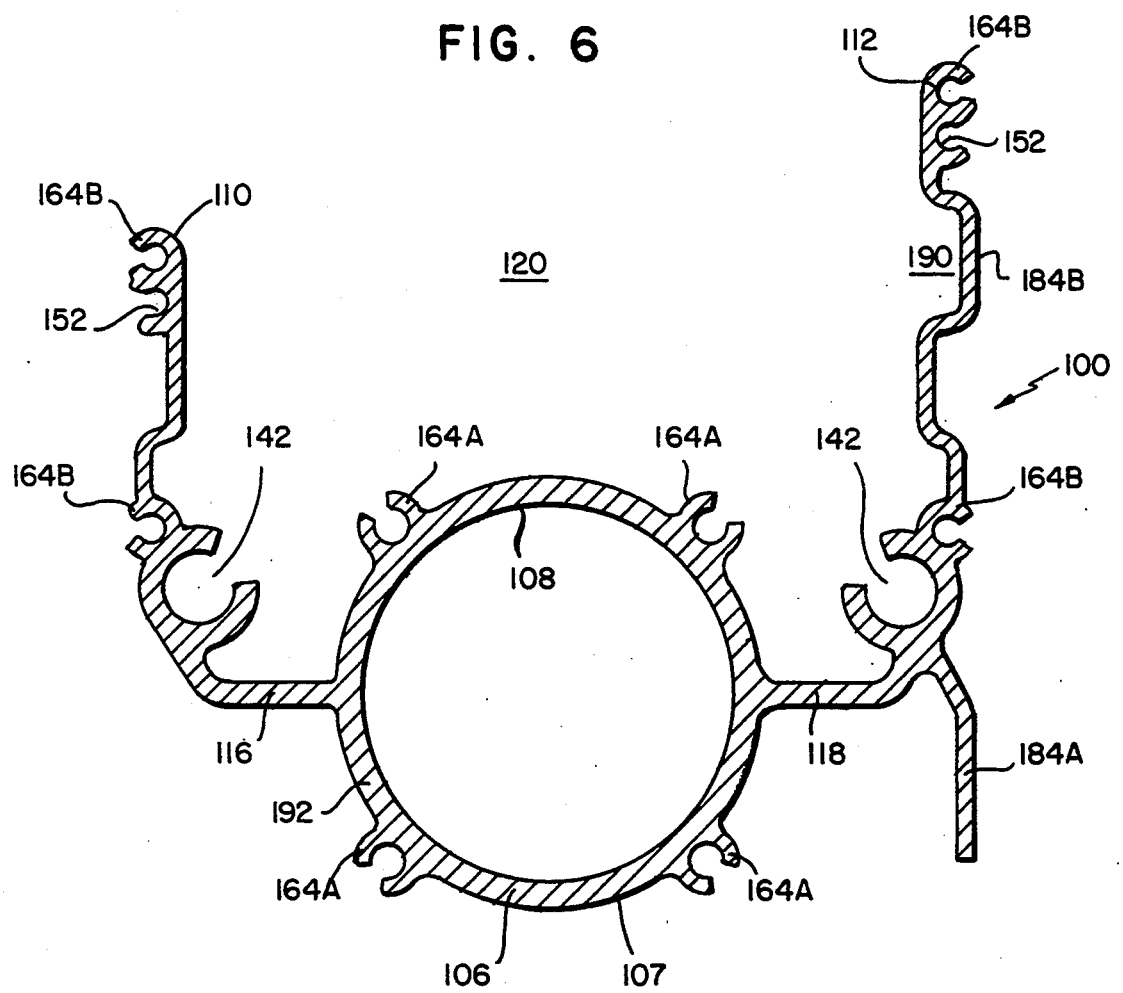
FIG. 6 is a cross sectional view of a reaction canister body part with an integral inflator chamber, in accordance with one embodiment of the invention.
Figure 7:
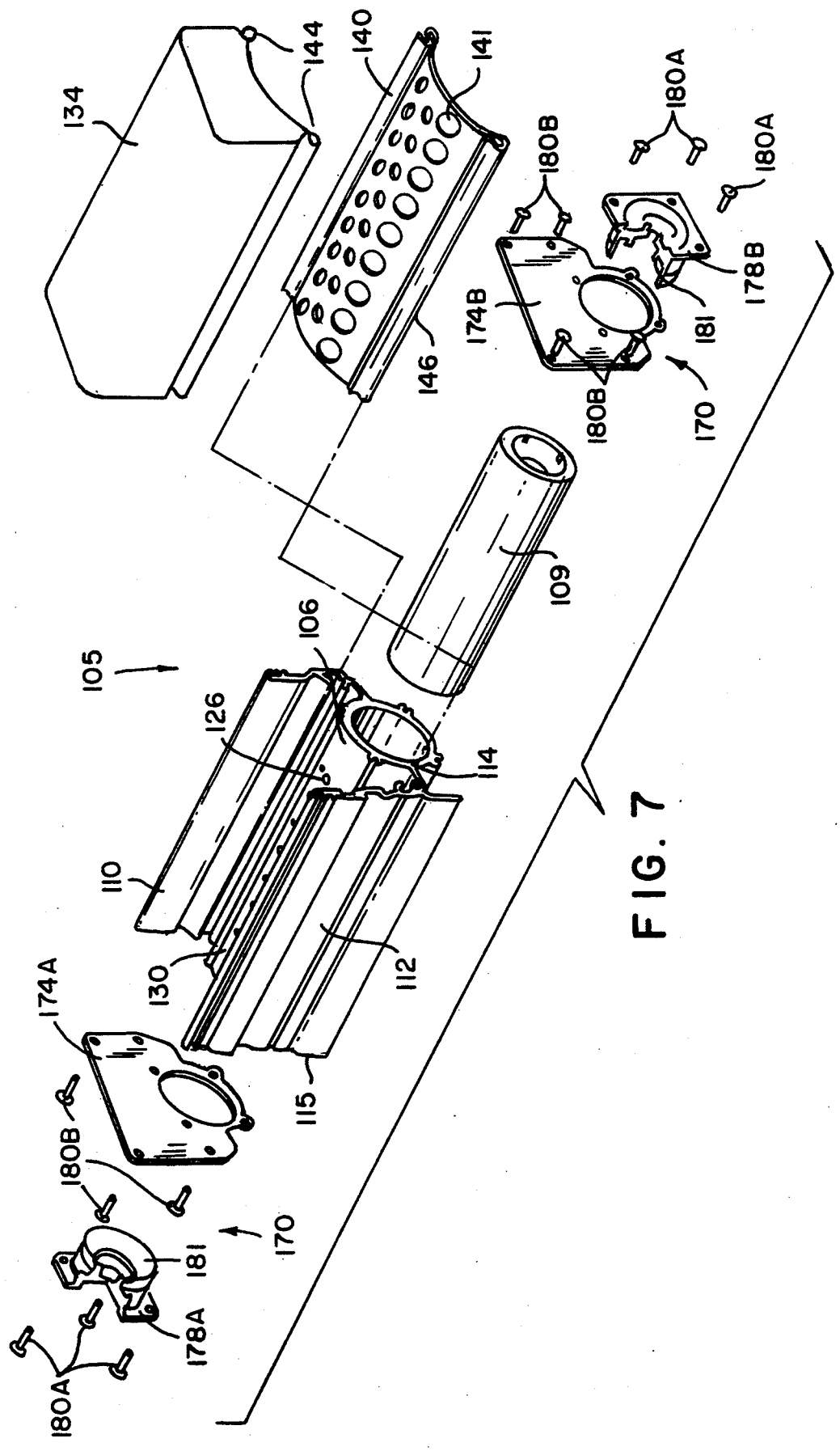
FIG. 7 is an exploded perspective view of an air bag module assembly in general accordance with one embodiment of the invention, having a reaction canister body part with an integral inflator chamber, as shown in FIG. 6.
Figure 8:
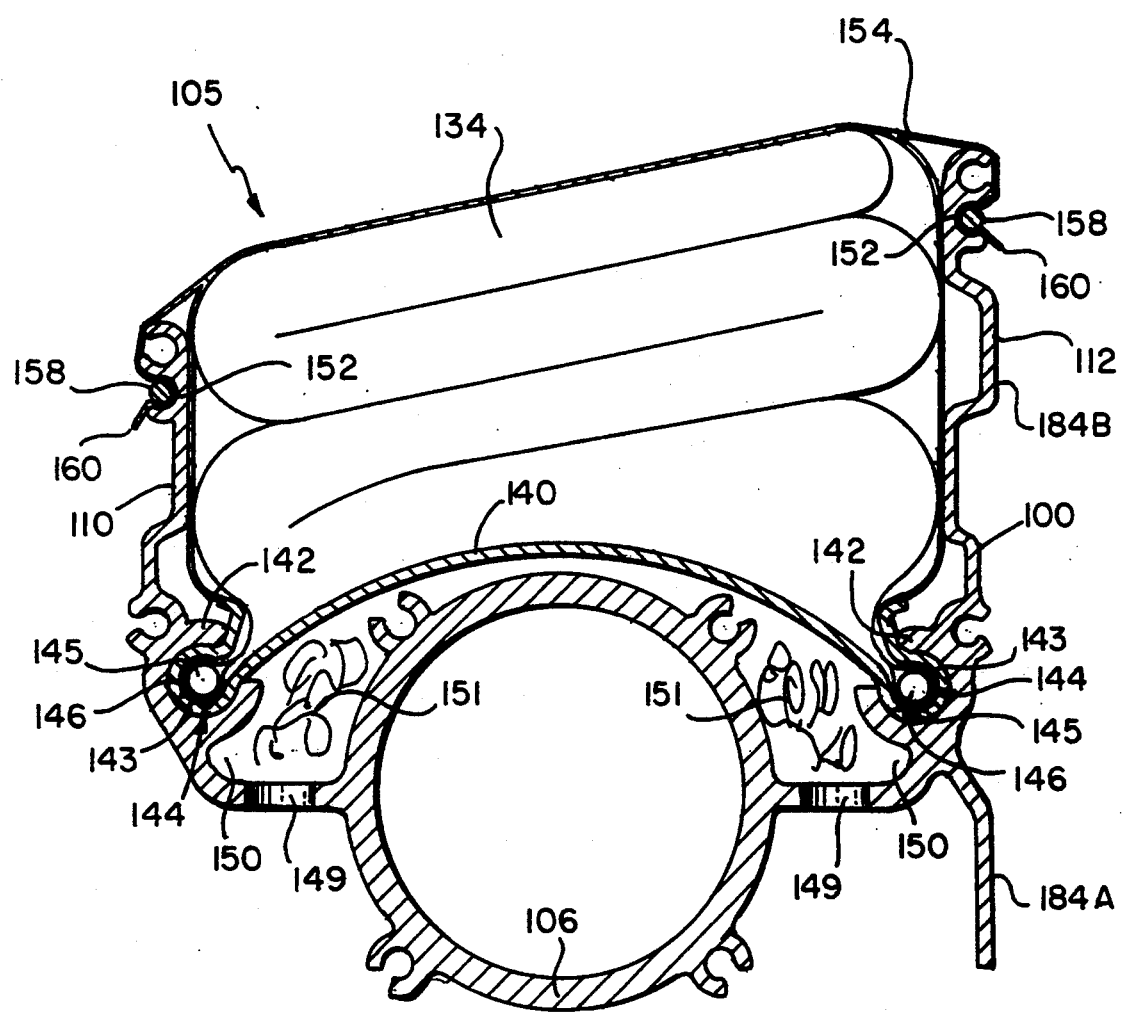
FIG. 8 is a cross sectional side view of the assembled air bag module assembly of FIG. 7 and showing the inclusion of a) a thermal conductive material within the cooling cavities and b) a protective cover about the outer periphery of the reaction canister air bag retaining cavity.

FIGS. 6-8 illustrate another aspect of the invention. These figures illustrate an extruded reaction canister or, more briefly, can body part, generally designated by the reference numeral 100, which includes the general form of a long, narrow, open receptacle or trough. The reaction canister body part 100 is shown separately in FIG. 6 and as a part of an air bag module assembly, generally designated by the reference numeral 105, in FIGS. 7 and 8.

The reaction canister body part 100 includes an integrally shaped inflator chamber 106 having an exterior surface 107 and an interior surface 108 and, like inflator chambers that are commonly included in inflators designed and used in air bag module assemblies, can serve to house a gas generant material, such as commonly associated with pyrotechnic inflators, such as a gas generant pack 109, as shown in FIG. 7.

An inflator chamber in the form of a tube having a circular cross section, as shown by the inflator chamber 106, will generally be preferred as such a structure is generally best suited for use in such applications wherein the chamber must withstand such pressure operation. It is to be understood, however, that in the practice of the invention, if desired, other shapes or forms of inflator chamber can be used.

The internal components of the inflator chamber 106 and the composition and form of the gas generant material housed therein form part of the present invention and may be any of a number of known constructions/formulations such as are commercially available. As discussed above and by way of example and not limitation, such internal components may comprise that disclosed in commonly assigned U.S. Pat. No. 4,890,860 granted to F. E. Schneiter on Jan. 2, 1990.

Turning to FIGS. 6–8, the reaction canister body part 100 includes first and second opposite side walls or panels, e.g., a top side wall and a bottom side wall, 110 and 112, respectively, and first and second opposite ends, 114 and 115, respectively. The side walls can, for example, be formed directly continuous with the integrally shaped inflator chamber 106 or, as shown, continuously formed therewith via side wall connecting portions 116 and 118, respectively.

The side walls 110 and 112, respectively, can generally be spaced apart so as to form an air bag retaining cavity, generally designated by the reference numeral 120, therebetween. In one preferred embodiment and as shown in the figures, the spaced apart side walls are generally parallel to each other, ensuring a more uniformly shaped air bag retaining cavity and thereby reducing the possibility of the air bag housed within the cavity therebetween undesirably getting caught or snagged such as by a protruding surface or edge of the reaction canister body part. It is to be understood, however, that the side walls can be otherwise angularly positioned relative to one another as may be desired in specific applications, such as to permit the accommodation of the reaction canister into a specifically shaped dash board or instrument panel opening.

In the illustrated embodiment, the side walls 110 and 112 are shown as being of different lengths, with the bottom side wall 112 being of a longer length than the top side wall 110. In general, it has been found that reaction canisters so shaped can more conveniently be incorporated within the dash board/instrument panel of most common automotive vehicles. It is to be understood, however, that the invention is not limited to use in conjunction with reaction canister side walls of such relative length. That is, the invention can similarly be used in conjunction with reaction canister body parts having side walls of similar lengths as well as reaction canister body parts wherein the length of the top side wall exceeds that of the bottom side wall.

As shown in FIG. 7, the inflator chamber 106 includes gas exit vents or ports 126 along a side 130 thereof. Such gas exit vents permit the gas generated within the inflation chamber to exit from the chamber and be directed for inflation of an air bag 134, as can more easily be seen by reference to FIGS. 7 and 8.

To assist in producing or forming a more uniform or orderly distribution of gas into the inflating air bag and whereby a more uniformly and/or orderly deployment of the inflating air bag can be effected, one or more flow directing devices can be incorporated within the reaction canister assembly. For example, such flow directing devices can take the shape or form of baffles or gas port passages of particular size, shape and/or arrangement.

In one preferred embodiment of the invention, such flow directing devices can take the form of and/or include an air bag retainer/diffuser device 140, as shown in FIGS. 7 and 8. The air bag retainer/diffuser device 140 includes a plurality of openings 141 therein to permit the passage of gas therethrough. The openings 141 are located and sized so as to provide a desired distribution of gas into the air bag 134.

A preferred such device or system for use in the practice of the invention is a retainer device/system such as described in commonly assigned U.S. patent application Ser. No. 07/993,280, filed on Dec. 18, 1992, and which device/system incorporates diffuser face member features such as described in commonly assigned U.S. patent application Ser. No. 07/993,277, also filed on Dec. 18, 1992, the text of which applications are fully incorporated herein by reference. As disclosed therein, the size, geometry, and arrangement of the gas passage openings can be appropriately designed to satisfy specific application needs and the invention is not necessarily limited to use with a diffuser with gas passage openings of any specific configuration. Further, as disclosed therein, such a diffuser device/system, in addition to fostering desired gas diffusion can also assist in: 1) facilitating module assembly; 2) maintaining proper air bag retention within the assembly, and 3) maintaining desired separation of the hot inflator surfaces from both the surface of the air bag as well as from contact by the vehicle occupants. For example, relative to the retaining of an air bag within the assembly, such a means of retaining an air bag can advantageously avoid or minimize the need for conventional fastener devices such as screws or rivets, for example.

In addition, a diffuser device/system, such as the diffuser 140, can serve to facilitate control of bell mouthing of the reaction canister, thereby assisting in maintaining the integrity of the reaction canister.

To that end, the reaction canister body part 100 includes, as a part of the side walls 110 and 112, integrally formed attachment sleeves 142. As will be described in more detail below with reference to FIGS. 7 and 8 and as fully described in the above-referenced U.S. patent application Ser. No. 07/993,280, such attachment sleeves allow for the fastenerless attachment of an air bag within an inflatable safety system. It is to be understood, however, that the practice of the subject invention in its broader aspects is not limited to use with such attachment sleeves and that, if desired, an alternative form of air bag retention/diffuser attachment preparation can be used, such as those that include fastener devices such as screws or rivets, such as described in the above-referenced U.S. patent application Ser. No, 07/993,277, for example. Further, it is to be understood that, if desired, the invention can be practiced via the utilization of a cushion retainer, such as disclosed in the above-referenced U.S. patent application Ser. No. 07/993,280, which device serves to retain an air bag (e.g., a cushion) within the assembly while minimizing or, preferably, avoiding the use of fasteners such as screws or rivets, but which in this case does not necessarily incorporate diffuser features therein. Also, it is to be understood that, if desired, the invention can be practiced both without the utilization of the referenced diffuser features and while making use of common forms of air bag attachment, such as the use of fasteners such as screws and/or rivets, for example.

As is known in the art, air bags in inflatable restraint systems can include one or more vent holes (not shown) therein whereby gases, such as produced via a gas generant material such as housed within the inflator chamber 106, can desirably be vented out of the air bag. Such air bag vent holes can advantageously assist in post deployment venting of the air bag both immediately after a crash event (e.g., as may be desired to soften the bag upon contact by a vehicle occupant thereby resulting in a greater cushioning effect and to reduce the likelihood or extent of rebound by such vehicle occupant upon such contact) and subsequent thereto (e.g., such as may be desired to facilitate the exiting from the vehicle by the occupant subsequent to the deployment event).

As perhaps more clearly seen by reference to FIGS. 7 and 8, the air bag 134 has a thickened peripheral edge 143. Such thickening of an air bag is described in the above-referenced U.S. patent applications, Ser. No. i.e., 07/993,277 and 07/993,280, and can take the form, as shown, of a hemmed loop 144 of air bag material at the gas inlet opening edge of the air bag into which a selected bead material 145 is placed to better ensure positive engagement of the air bag 134 into the assembly 105. The air bag retainer/diffuser device 140 includes a channel 146 thereabout into which channel the thickened peripheral edge of the air bag can be inserted so as to be in cooperative relation with said attachment sleeve preparation and thus secured to form an air bag/diffuser subassembly for joinder to the reaction canister body part, as shown and as described in detail in the above-referenced patent applications.

As disclosed in the above-referenced patent application, U.S. Ser. No. 07/993,277, the bead material can suitably be fabricated from a wide range of materials such as metal or, preferably, plastic, especially an extruded thermoplastic and can take various shapes or forms to meet the needs of particular applications.

To assist in effecting desired air bag venting, the illustrated reaction canister body part 100 further includes canister vent holes 149 about the side wall connecting portions 116 and 118, respectively (see FIG. 8). Such canister vent holes allow for "behind the bag venting", whereby gas is vented from the canister in a rearward fashion thereby minimizing the likelihood of contact between the vented gas and the vehicle occupant. In addition, such canister vent holes permit a leveling off the breakout pressure, e.g., the pressure at which an air bag initially being deployed breaks out through the cover layer of the assembly, such as from the air bag retaining cavity and into the interior of the vehicle, for example.

In the illustrated embodiment, the reaction canister body part 100 forms gas cooling cavities 150 wherein vented gases can suitably be cooled. Further, as shown in FIG. 8, a thermal conductive material 151 can be placed within the cooling cavities 150 to assist in the cooling of, e.g., removal of heat from, the gases vented out from the air bag. Such a thermal conductive material preferably has a large surface and is capable of absorbing large amounts of heat while permitting the vented gas to be passed therethrough. The so positioned thermal conductive material thus functions to assist in retaining generated or resulting heat within the confines of the reaction canister and thus away from the vehicle occupant. For example, such a thermal conductive material can take the form of a metallic wool such as steel wool or, more preferably, due to the relatively greater heat conducting ability and lighter weight of aluminum, an aluminum wool.

As perhaps more clearly seen in conjunction with FIG. 8, the body part further includes protective cover retaining preparations 152, shown as taking the form of slots about the outer extremity of each of the side walls 110 and 112, respectively. A protective cover 154 such as of fiber reinforced paper, for example, can be included as a part of the air bag module assembly 105 in the form of a wrap joined to the reaction canister body part 100 about the air bag 134 within the air bag retaining cavity 120 of the assembly. Such a protective cover 154 can be secured to the reaction canister body part 100 such as with an elastic band or other selected bead material 158 placed about the outer edge 160 of the protective cover 154, with the bead material secured within such a protective cover retainer slot preparation 152. Such a protective cover serves to help protect the air bag from damage such as by accidental or other undesired contact such as by or with other elements of the inflatable restraint system as well as extraneous elements in the environment to which the air bag can be exposed. Also, such a protective cover serves to desirably keep debris out of the reaction canister assembly.

In practice, such a protective cover is preferably fabricated of a tough, wear resistant material which, while normally tear resistant, can be preferably broken or ruptured at predetermined or selected sites such as through the aid of perforations therein. For example, such a protective cover can be fabricated of fiber reinforced paper, such as that sold by E. I. Du Pont de Nemours Co. under the name TYVEK. It is to be understood, however, that other appropriate materials such as having such described or preferred properties or characteristics can also be used.

Also, the reaction canister body part 100 includes a plurality of end closure attachment preparations 164. Such attachment preparations can take the form of a hollow or, as the body part is preferably prepared by extrusion fabrication, such attachment preparations can preferably take the form of a groove or what is commonly referred to in the extrusion field as a "screw slot." It is to be understood, however, that the attachment preparations and the form of attachment are not limited to the use of screw fasteners.

As shown, such attachment preparations 164 are preferably spaced about the periphery of the body part 100, both along the side walls 110 and 112, and about the inflator chamber 106, preferably about the exterior surface 107 thereof, so as to ensure secure attachment of end closures 170 (see FIG. 7) to the reaction canister body part 100 and preferably at least at each of the opposite ends 114 and 115 thereof. In general, the end closures 170 retain the cross sectional shape of the reaction canister body part 100.

In the air bag module assembly of the invention, the end closures can take the form of end plates such as with an integral inflator chamber base or, as may be preferred and as is shown in FIG. 7, a combination of end plates 174 (individually designated as 174A and 174B, respectively) and end bases 178 (individually designated as 178A and 178B, respectively). As will be described in more detail below, fasteners 180, such as swaging screw fasteners, such as made of appropriately hardened steel and which permits use in such pressure applications, can be used in securing such end closures in the assembly. Further, in one preferred embodiment of the invention and as illustrated in FIGS. 6–8, in order to simplify and reduce the number of parts required in the assembly, at least some of the fasteners can be used to simultaneously secure both end plates and end bases. Thus, the fasteners denominated 180A are used in simultaneously securing both end plates and end bases, while the fasteners denominated 180B are used to secure end plates and not end bases.

In such a design, the end plates 174 primarily serve to enclose the ends of the air bag retaining cavity formed by the reaction canister body part 100, while the end bases 178 primarily serve to enclose the ends of the integral inflator chamber 106 formed in the reaction canister body part 100 of the invention. The end bases 178 include a mating face 181 which upon assembly mates with the integral inflator chamber 106. That is, the mating face 181 properly receives one of the ends of the integrally shaped inflator chamber 106 to provide closure to the chamber 106. In such an assembly, end bases comprising thicker and/or stronger materials than used in the end plates will typically be preferred as the end closures at the inflator chamber will typically be subjected to significantly greater pressures than the end closures of the air bag retaining cavity. Similarly, the attachment preparations used for securing such end bases to the assembly typically must be able to withstand such significantly greater pressures. To this end, in the illustrated embodiment, the end closure attachment preparations for use in attaching such end bases to the reaction canister body part, e.g., the end closure attachment preparations designated 164A and generally in the form of four screw slots relatively equally spaced about the exterior surface 107 of the inflator chamber 106, and the fasteners used in combination therewith, i.e., the fasteners 180A, are of both a larger diameter and the fasteners are of a greater length than the end closure attachment preparations and fasteners, i.e., the preparations 164B and the fasteners 180B, that are used solely in securing end plates 174 to the reaction canister body part 100. Such a system and method of end closure attachment provides a relatively inexpensive, yet secure system and method for attaching end closures within the assembly to the reaction canister body part of the invention.

As will be appreciated, the number and location of such attachment preparations can be appropriately altered, as desired, to satisfy the needs of specific applications.

It is further to be understood, however, that the invention is not limited to use with such end closures or such means of attachment and that other forms of closure and means of attachment including swaging and welding processes such as inertial and M.I.G. welding, for example, can be used, as desired.

The reaction canister body part 100 can also include one or more mounting portions, generally designated by the reference numeral 184. Such mounting portions can be either of an external type, i.e., for mounting of the reaction canister body part within a selected vehicle, or an internal or semi-internal type, i.e., for mounting of items to or within the reaction canister body part. As is to be understood and as will be apparent to those skilled in the art, an external mounting portion, such as the mounting bracket 184A, can be appropriately positioned, orientated, shaped, and sized as desired to effect the desired result. Further, an internal or semi-internal type mounting portion, such as the mounting bracket 184B, can be extruded as a segment of a side wall, e.g., the side wall 112. Such a mounting bracket 184B can, for example, be used in the formation of a shielded cavity or recess 190 useful in distancing and shielding the air bag from fastening nuts or other elements (not shown) used in the reaction canister assembly.

The body part 100 is preferably fabricated by a continuous extrusion of an extrudable material, such as magnesium or, preferably, aluminum; which material is able to withstand the high temperatures and pressures to which such body part would typically be subjected to in such inflatable restraint system applications. Such extrusion fabrication of the body part permits and facilitates the incorporation into the design thereof, as needed or desired, of various design features and/or characteristics. As described above, such design features/characteristics can, for example, include as desired or needed one or more of the following: diffuser and/or air bag retainer attachment preparations, vent holes to facilitate desired gas venting, cooling cavities to permit desired gas cooling, protective cover retaining preparations to facilitate the retaining of a protective cover about the assembly, end closure attachment preparations whereby the attachment of end closures such as end plates or end plate/end base combinations to the reaction canister body part can be simplified, and mounting portions (both external, e.g., for mounting of the reaction canister body part within a selected vehicle, and internal or semi-internal, e.g., for mounting of items to or within the reaction canister body part).

Further, such extrusion fabrication of the body part permits the rapid fabrication of the body with the added advantage that the extrusion can be cut to varying lengths to permit incorporation thereof in variously sized assemblies.

The end closures, e.g., end plates and/or end plates with end bases, assist in maintaining the shape of the body part 100. In practice, such end closures may be made of the same material as the reaction canister body part, e.g., aluminum, and can be stamped, machined, formed or extruded, as desired.

In order to counteract the forces, described above, to which a reaction canister will typically be subjected to during air bag deployment and which forces can result in undesired bell mouthing of the reaction canister, which in turn can result in damage to the surrounding instrument panel structure or components, it is generally desirable that the reaction canister be relatively rigid. In practice, a reaction canister body part incorporating one or more of the features described above will have increase rigidity as a result of the shape and forms added to effect the incorporation of the features therein. It is to be understood, however, that if additional rigidity is desired, such rigidity can be provided to the assembly and the parts thereof such as through the addition of selected stiffening ridges or flanges, not shown, either as a part of the reaction canister body part extrusion or added thereto such as by welding.

Generally, the reaction canister body part of the invention will preferably be formed from one material and it will be preferred that the wall forming the inflator chamber will be thicker than the balance of the wall portions of the part, i.e., the thickness of the wall 192 will exceed the thickness of the top side wall 110 and the bottom side wall 112. Such thicker wall portions are better suited to contain the relatively high gas generant pressures, e.g., 1500–3000 psi, such as would be expected to be produced therein with common pyrotechnic gas generant materials.

The swaging screw is a form of fastener that has been found to have particular utility in the practice of the invention. Swaging screw fasteners generally form or swage a thread into a fastener hole or other attachment preparation upon insertion. (The swaging process produces a removal torque in excess of 80% of the screw setting torque.) Such thread formation generally occurs as a result of a stretching or a displacement of the material, typically metal, into which it is inserted, as opposed to a general removal of such material as commonly occurs when using a conventional thread cutting screw fastener. Also, as the fasteners are for use in conjunction with component parts of a vehicular inflatable restraining system, the use of a thread cutting screw fastener can result in the formation of fine metal filings which are undesirable and not easily removed. In contrast, as described above, such metal filings are generally not created with swaging screw fasteners. The use of swaging screw fasteners allows the attachment preparations in the reaction canister body part of the invention to be formed by simple extrusion during the manufacture process, with the swaging screw fastener forming the threading during insertion.

As will be apparent to those skilled in the art and guided by the teachings provided herein, other forms of fasteners such as rivets, bolts, or other screw fasteners, for example, can, if desired, be used in the practice of the invention. A primary consideration in the selection of a fastener and the material of construction used therefore, however, is that the fastener can appropriately operate under the pressures to which it will be subjected, e.g., pyrotechnic inflators typically produce pressures in the range of 1500–3000 psi.

The provision of a reaction canister body part having an integral inflator chamber also both simplifies the manufacture and assembly of corresponding inflatable restraint modules and assures greater safety in operation as the disposition of the gas exit vents or ports in the inflator chamber is fixed relative to the reaction canister. Thus, the time and effort normally required in assembly to ensure that the gas exit vents are properly orientated, as well as the likelihood of incorrect orientation, such as due to misalignment of the gas exit vents, are virtually eliminated.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. A trough-shaped body part for an inflatable passive restraint system reaction canister, said body part being a one-piece structure formed by extrusion comprising:
   first and second opposite side walls defining an air bag retaining cavity therebetween and a continuous circumference tubular chamber portion of an inflator, said chamber portion capable of withstanding a pressure of about 1500 psi and having gas exit vents along at least one side thereof, said body part also having first and second opposite ends with a plurality of end closure attachment preparations at each said opposite end.

2. The reaction canister body part of claim 1 wherein the fabrication of the body part is of continuous aluminum extrusion.

3. The reaction canister body part of claim 1 wherein at least one of said side walls is continuously formed with said inflator chamber portion via a side wall connecting portion and wherein said side wall connecting portion includes at least one vent hole permitting venting of gas from an assembly incorporating the reaction canister body part.

4. The reaction canister body part of claim 1 additionally comprising at least one gas cooling cavity.

5. The reaction canister body part of claim 4 wherein said cooling cavity contains a thermal conductive material.

6. The reaction canister body part of claim 5 wherein said thermal conductive material comprises aluminum wool.

7. The reaction canister body part of claim 1 additionally comprising at least one integrally formed attachment sleeve preparation adapted for the attachment to said body part of at least one device selected from the group consisting of an air bag retainer, a diffuser, and an air bag retainer and diffuser.

8. The reaction canister body part of claim 1 additionally comprising at least one integrally formed mounting portion of an external type for mounting of said reaction canister body part into a vehicle.

9. The reaction canister body part of claim 1 additionally comprising at least one integrally formed mounting portion forming a shielded cavity within said reaction canister body part.

10. The reaction canister body part of claim 1 additionally comprising at least one integrally formed protective cover retaining preparation.

11. A reaction canister for an inflatable passive restraint system comprising:
    a one-piece extruded trough-shaped body part having first and second opposite side walls defining an air bag cavity therebetween and a continuous circumference tubular chamber portion of an inflator, said chamber portion capable of withstanding a pressure of about 1500 psi and having gas exit vents along at least one side thereof, said body part also having first and second opposite ends with a plurality of end closure attachment preparations at each said opposite end; and
    first and second end closures attached to a respectively associated opposite end of said body part by means positioned in cooperative relation with the respective end closure attachment preparations, each of said first and second end closures further having an inflator chamber base portion positioned to receive an associated one of the ends of the inflator chamber portion of said body part.

12. The reaction canister of claim 11 wherein at least one of said end closures comprises an end plate and an end base.

13. The reaction canister of claim 11 wherein at least one of said end closures comprises an end plate with an integral end base.

14. The reaction canister of claim 11 wherein the fabrication of the body part is of continuous aluminum extrusion.

15. The reaction canister of claim 11 wherein at least one of said side walls is continuously formed with said inflator chamber portion via a side wall connecting portion forming at least one gas cooling cavity, wherein said side wall connecting portion includes at least one vent hole permitting venting of gas from an assembly incorporating the reaction canister body part and wherein said cooling cavity contains a thermal conductive material.

16. The reaction canister of claim 15 wherein said thermal conductive material comprises aluminum wool.

17. The reaction canister of claim 11 additionally comprising an air bag retainer and diffuser and wherein said body part additionally comprises at least one integrally formed attachment sleeve preparation adapted for the attachment of said air bag retainer and diffuser to said body part.

18. The reaction canister of claim 11 wherein said body part additionally comprises at least one integrally formed mounting portion of an external type for mounting of said reaction canister body part into a vehicle.

19. The reaction canister of claim 11 wherein said body part additionally comprises at least one integrally formed mounting portion forming a shielded cavity within said reaction canister body part.

20. A reaction canister for an inflatable passive restraint system comprising:

a one-piece trough-shaped body part having first and second opposite side walls and a continuous circumference tubular chamber portion of an inflator, said chamber portion capable of withstanding a pressure of about 1500 psi and having gas exit vents along at least one side thereof, said body part having at least one integrally formed mounting portion of an external type for mounting of said reaction canister body part into a vehicle, said body part also having first and second opposite ends with a plurality of end closure attachment preparations at each said opposite end, the fabrication of said body part being of continuous aluminum extrusion, at least one of said side walls being continuously formed with said inflator chamber portion via a side wall connecting portion forming at least one gas cooling cavity, said side wall connecting portion of said body part including at least one vent hole to permit venting of gas from said reaction canister and with said gas cooling cavity containing a thermal conductive material comprising aluminum wool to facilitate cooling of vented gas, said reaction canister body part additionally comprising at least one attachment sleeve preparation adapted for the attachment to said body part of an air bag retainer and diffuser;

an air bag retainer and diffuser attached to said reaction canister body part by insert means positioned in cooperative relation with said attachment sleeve preparation; and first and second end closures attached to a respectively associated opposite end of said body part by screw means positioned in cooperative relation with the respective end closure attachment preparations, each of said first and second end closures further having an inflator chamber base portion positioned to receive an associated one of the ends of the inflator chamber portion of said body part, wherein at least one of said end closures comprises an end plate and an end base.

* * * * *

UNITED STATES PATENT AND TRADEMARK OFFICE
CERTIFICATE OF CORRECTION

PATENT NO. : 5,407,227
DATED : 18 April 1995
INVENTOR(S) : Lauritzen et al.

It is certified that error appears in the above-indentified patent and that said Letters Patent is hereby corrected as shown below:

At column 11, line 5, "form part" should be --form no part--.

Signed and Sealed this

Twenty-eighth Day of May, 1996

Attest:

BRUCE LEHMAN

Attesting Officer  Commissioner of Patents and Trademarks